(12) United States Patent
Jeon

(10) Patent No.: US 9,185,274 B2
(45) Date of Patent: Nov. 10, 2015

(54) PORTABLE WATERPROOF PACK WITH AIR BLADDER

(71) Applicant: Youngsu Jeon, Gangwon-Do (KR)

(72) Inventor: Youngsu Jeon, Gangwon-Do (KR)

( * ) Notice: Subject to any disclaimer, the term of this patent is extended or adjusted under 35 U.S.C. 154(b) by 158 days.

(21) Appl. No.: 13/676,193

(22) Filed: Nov. 14, 2012

(65) Prior Publication Data

US 2013/0215254 A1    Aug. 22, 2013

(30) Foreign Application Priority Data

Jan. 9, 2012    (KR) .................. 20-2012-0000216

(51) Int. Cl.
| | |
|---|---|
| *H04N 9/47* | (2006.01) |
| *H04N 7/18* | (2006.01) |
| *H04N 5/225* | (2006.01) |
| *G03B 17/08* | (2006.01) |
| *G03B 17/58* | (2006.01) |
| *A45C 11/00* | (2006.01) |
| *A45C 13/00* | (2006.01) |
| *A45C 13/02* | (2006.01) |
| *A45C 11/22* | (2006.01) |

(52) U.S. Cl.
CPC .............. *H04N 5/2252* (2013.01); *A45C 11/00* (2013.01); *A45C 13/008* (2013.01); *A45C 13/021* (2013.01); *G03B 17/08* (2013.01); *G03B 17/58* (2013.01); *A45C 11/22* (2013.01); *A45C 2011/002* (2013.01); *A45C 2200/10* (2013.01)

(58) Field of Classification Search
USPC ............ 348/81, 82, 53, 49, 158, 202, 208.11, 348/208.12, 221.1, 276, 360, 362, 376, 348/838; 396/25, 26, 27, 28, 29; 361/678, 361/679.55, 679.56; 441/1, 6, 87, 88; 455/95
See application file for complete search history.

(56) References Cited

U.S. PATENT DOCUMENTS

| | | | | |
|---|---|---|---|---|
| 4,690,128 | A * | 9/1987 | Gibbons .................... | 126/705 |
| 5,758,200 | A * | 5/1998 | Inoue et al. .................... | 396/25 |
| 6,014,522 | A * | 1/2000 | Reber, II .................... | 396/29 |
| 6,525,762 | B1 * | 2/2003 | Mileski et al. ................. | 348/81 |
| 7,525,596 | B2 * | 4/2009 | Yamaguchi .................... | 348/375 |
| 7,871,205 | B2 * | 1/2011 | Inoue .................... | 396/422 |
| 8,453,835 | B2 * | 6/2013 | So .................... | 206/320 |
| 8,654,189 | B1 * | 2/2014 | Spangler et al. .............. | 348/81 |
| 2006/0098966 | A1 * | 5/2006 | Takahashi et al. ............. | 396/29 |
| 2007/0110416 | A1 * | 5/2007 | Yamaguchi et al. ............ | 396/27 |
| 2008/0062269 | A1 * | 3/2008 | Omer .................... | 348/211.11 |
| 2010/0147715 | A1 * | 6/2010 | Miglioli et al. ............ | 206/316.2 |

* cited by examiner

*Primary Examiner* — Jefferey Harold
*Assistant Examiner* — Mustafizur Rahman
(74) *Attorney, Agent, or Firm* — AKC Patents LLC; Aliki K. Collins

(57) ABSTRACT

The present invention relates to a portable waterproof pack, and more particularly, to a portable waterproof pack with an air bladder pack, which includes an air bladder pack, into which an air is injected, formed in a rear surface of a pack main body, and thus, can float on the water to reduce a risk of losing a portable terminal, such as a smart phone, without a buoyancy means when the portable terminal falls into water.

3 Claims, 8 Drawing Sheets front surface rear surface front surface rear surface rear surface 1    rear surface 2 front surface rear surface

PORTABLE WATERPROOF PACK WITH AIR BLADDER

TECHNICAL FIELD

The present invention relates to a portable waterproof pack with an air bladder pack, and more particularly, to a portable waterproof pack with an air bladder pack, which includes an air bladder pack, into which an air is injected, formed in a rear surface of a pack main body, and thus, can float on the water to reduce a risk of losing a portable terminal, such as a smart phone, without a buoyancy means when the portable terminal falls into water.

BACKGROUND ART

Generally, a portable waterproof pack is used for containing a portable telecommunication terminal such as a cell phone or a smart phone such that a device inside the portable waterproof pack does not get damaged when the portable waterproof pack contacts water or falls into water.

However, the related art portable waterproof pack does not float on the water, and thus, may be lost.

Especially, a weight of a current electronic product such as a smart phone and a camera is heavy, and thus, if a buoyancy strap is not coupled to the related art portable waterproof pack, a risk of losing the related art portable waterproof pack cannot be avoided when the related art portable waterproof pack falls into the water.

DISCLOSURE OF INVENTION

Accordingly, the present invention is directed to a portable waterproof pack with an air bladder pack, which substantially obviates one or more problems due to limitations and disadvantages of the related art. An aspect of the present invention is directed to provide a portable waterproof pack with an air bladder pack, which includes an air bladder pack, into which an air is injected, formed in a rear surface of a pack main body, and thus, can float on the water instead of sinking to the bottom of the water to reduce a risk of losing a portable terminal when the portable terminal falls into water.

To achieve these and other advantage and in accordance with the purpose of the invention, as embodied and broadly described herein, there is provided a portable waterproof pace with an air bladder pack comprising a pack main body which has a certain thickness and inside which an empty space is formed, a transparent window which is formed in a front surface of the pack main body in order for a portable terminal contained inside the pack main body to be seen, and a lenses window which is formed in a rear surface of the pack main body in order for a camera lenses of the portable terminal contained inside the pack main body to be exposed, wherein, an air bladder pack, which generates a buoyancy in order for the pack main body to float on the water to prevent a portable terminal from being lost when the pack main body falls into the water, is formed in a rear surface of the pack main body.

The air bladder pack may be formed in a lower portion of the transparent lenses window.

An upper portion of the air waterproof pack may be formed to deviate from a lower portion of the lenses window, the upper portion facing the lenses window.

An entrance-part fixing member may be formed in an upper portion of the air bladder pack so as to fix the entrance part.

ADVANTAGEOUS EFFECTS

As described above, the a portable waterproof pack according to the present invention includes an air bladder pack, into which an air is injected, formed in a rear surface of a pack main body, and thus, can float on the water instead of sinking to the bottom of the water to reduce a risk of losing a portable terminal when the portable terminal falls into water.

Moreover, even though a weight of a current electronic product such as a smart phone and a camera is heavy, the portable waterproof pack according to the present invention does not sink to the bottom of the water without a buoyancy strap, thereby an inundation being avoided.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODES FOR CARRYING OUT THE INVENTION

Reference will now be made in detail to the exemplary embodiments of the present invention, examples of which are illustrated in the accompanying drawings. Wherever possible, the same reference numbers will be used throughout the drawings to refer to the same or like parts. Hereinafter, the portable waterproof pack with an air bladder pack according to the embodiments of the present invention will be described in detail with reference to the accompanying drawings.

Figure 1A:
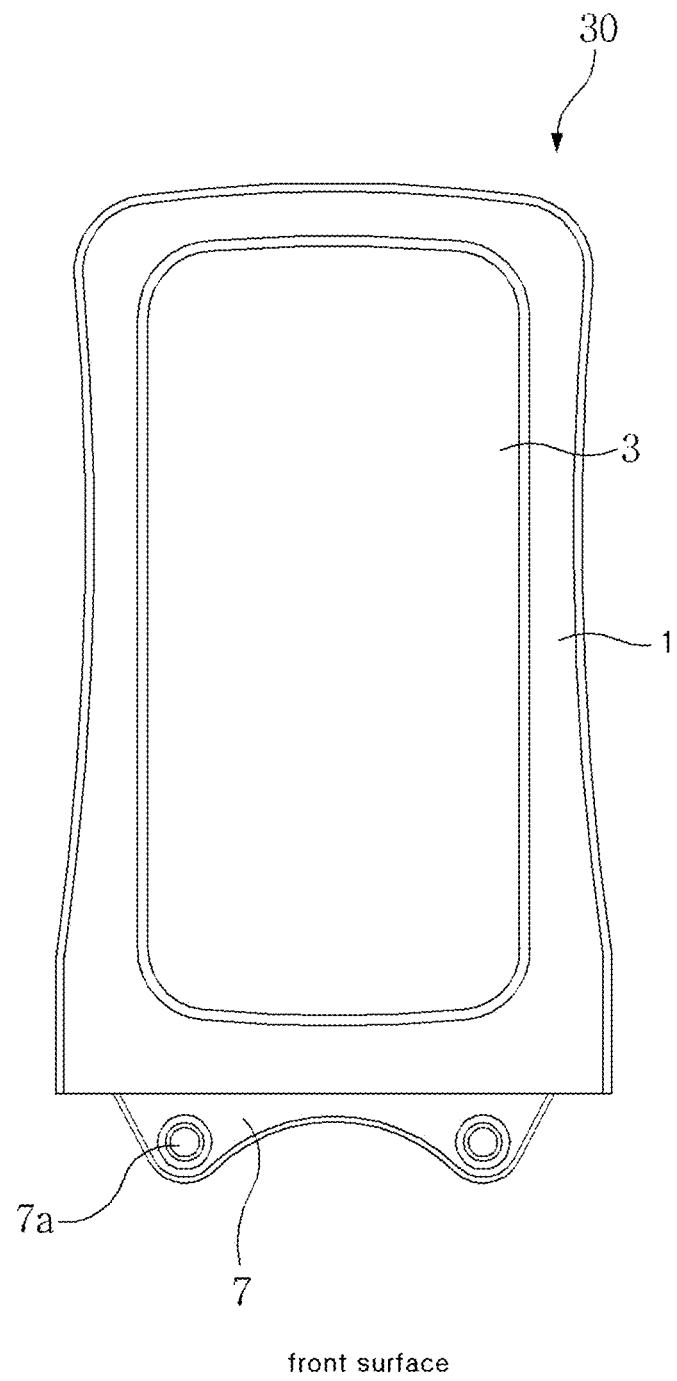
FIGS. 1a and 1b are a front view and a rear view of a portable waterproof pack with an air bladder pack according to a present invention.
Figure 1B:
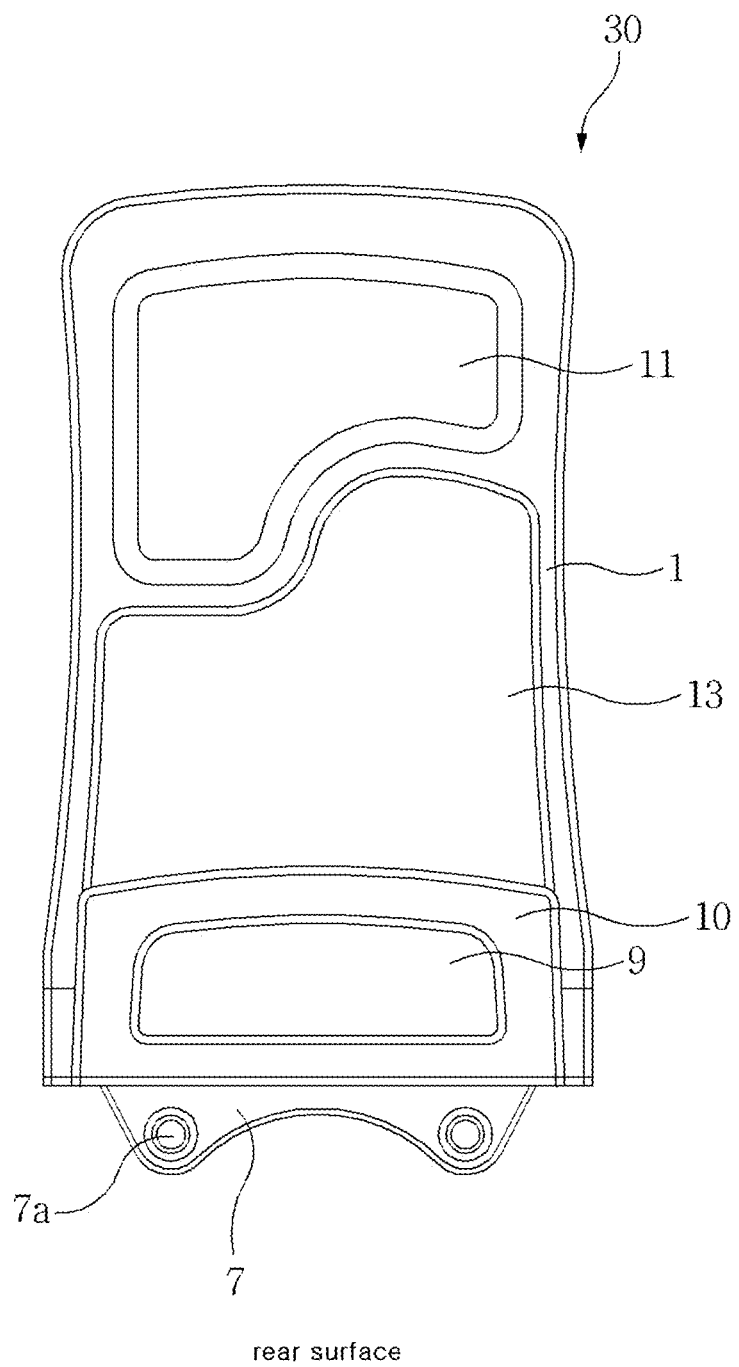
Figure 2A:
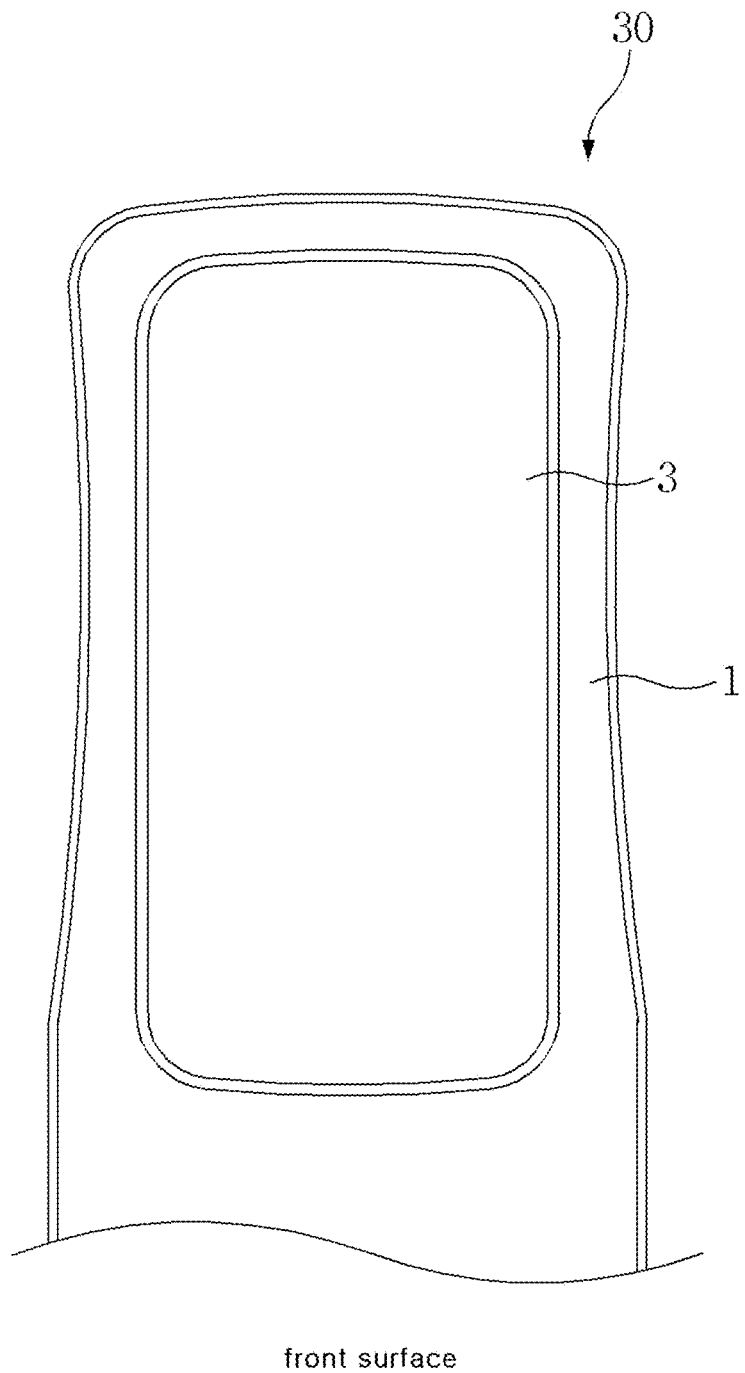
FIGS. 2a and 2b are enlarged views of a portion of an upper portion of the portable waterproof pack in FIGS. 1a and 1b, and illustrate an air injection port coupled to the air bladder pack.
Figure 2B:
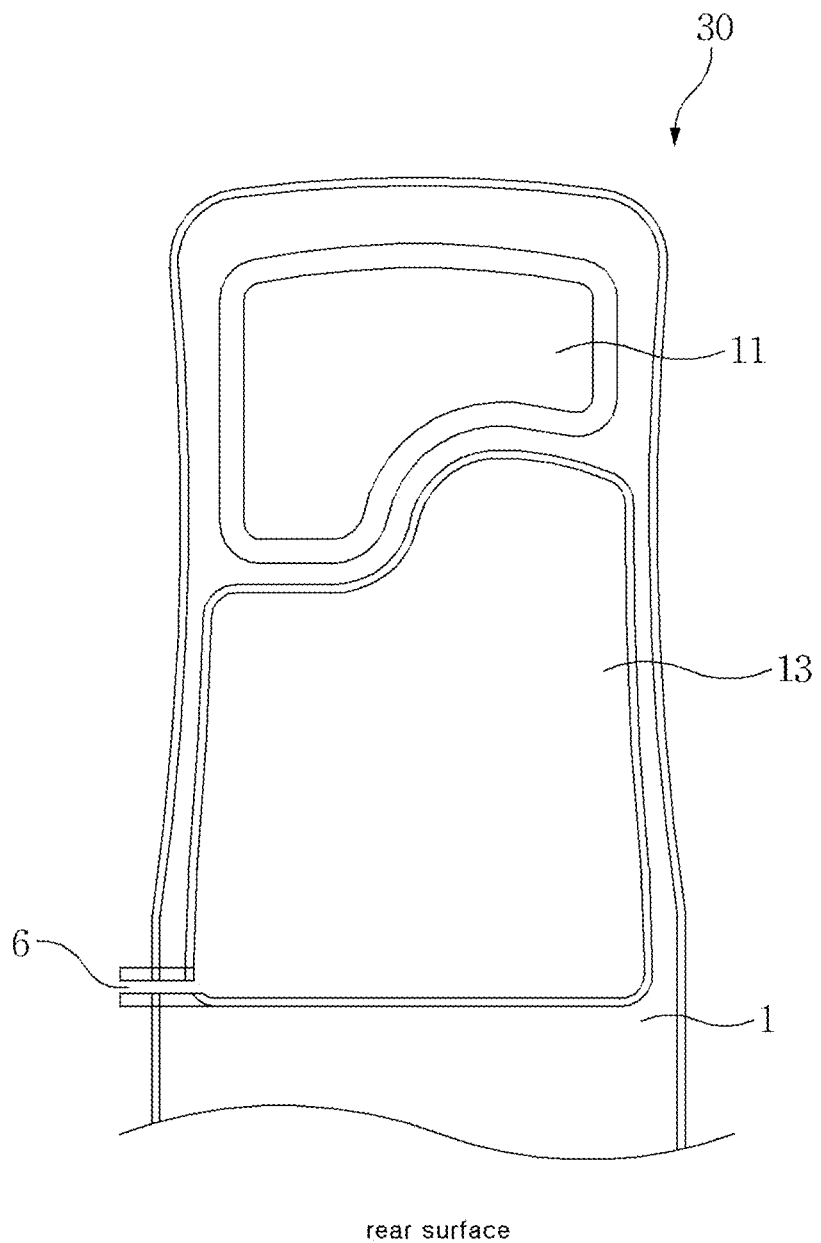
Figure 3:
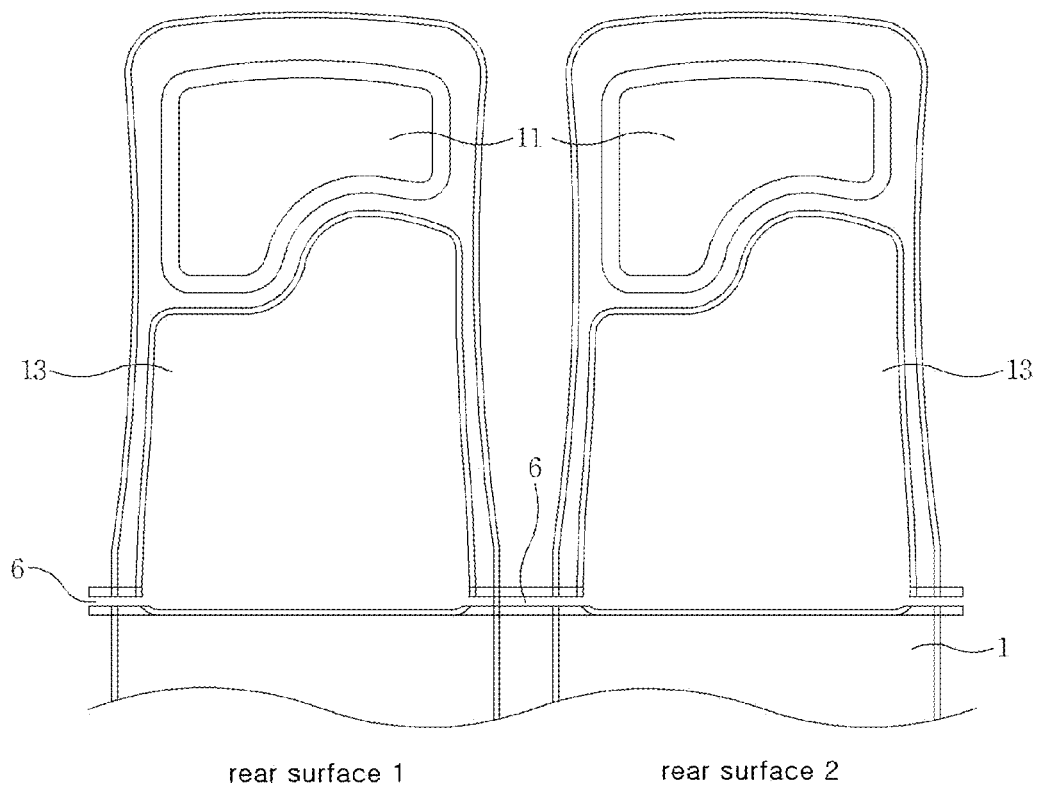
FIG. 3 is an exemplary diagram illustrating a connection shape of air injection ports in the course of manufacturing the portable waterproof packs according to the present invention.

FIGS. 1a and 1b are a front view and a rear view of a portable waterproof pack with an air bladder pack according to a present invention, FIGS. 2a and 2b are enlarged views of a portion of an upper portion of the portable waterproof pack in FIGS. 1a and 1b, and illustrate an air injection port coupled to the air bladder pack, and FIG. 3 is an exemplary diagram illustrating a connection shape of air injection ports in the course of manufacturing the portable waterproof packs according to the present invention. Also, FIG. 3 is an exemplary diagram illustrating a forming state of air injection ports coupled to the air bladder packs in the course of manufacturing the portable waterproof packs according to the present invention.

Figure 4A:
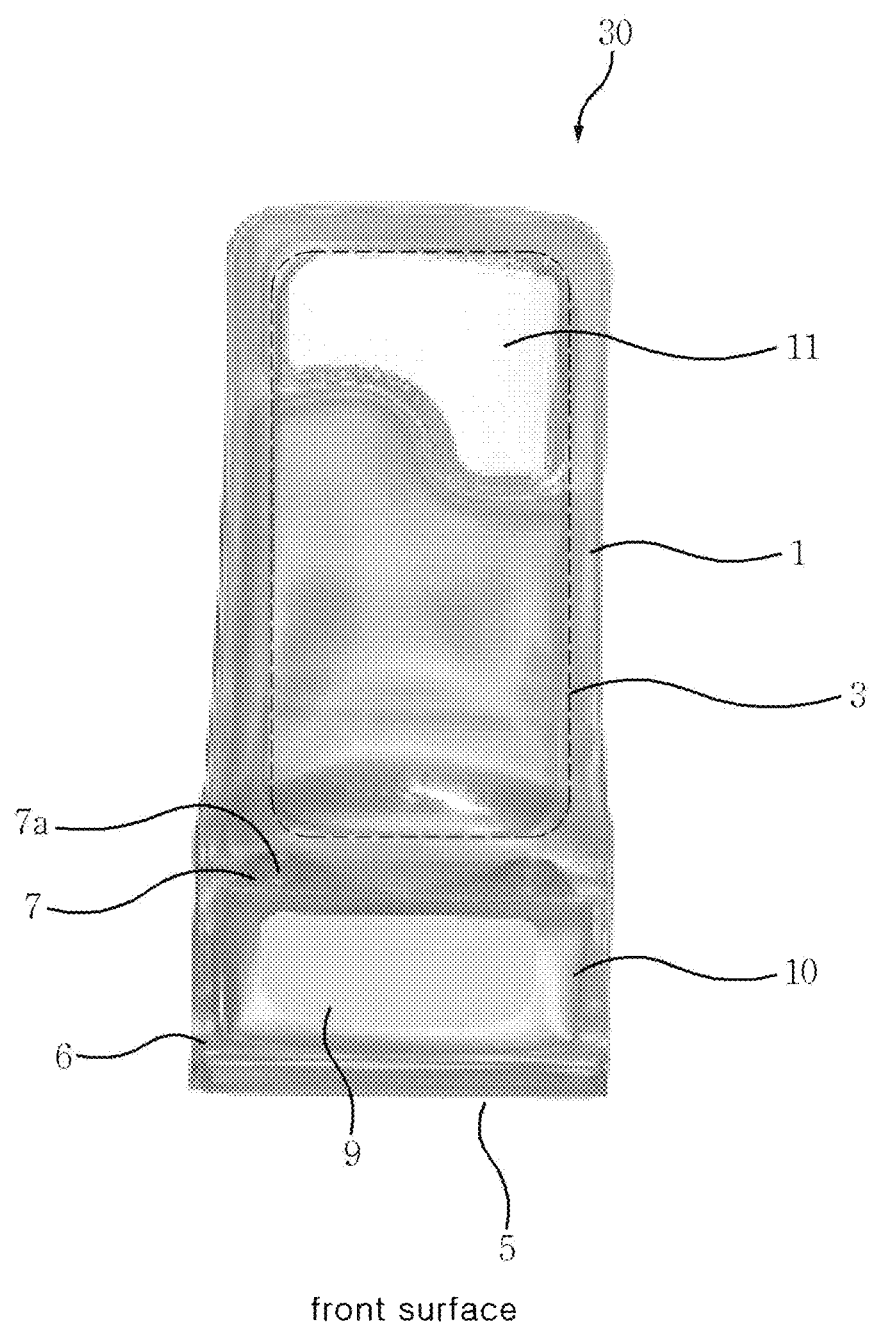
FIGS. 4a to 4c are exemplary diagrams illustrating various pictures of a real portable waterproof pack according to the present invention.
Figure 4B:
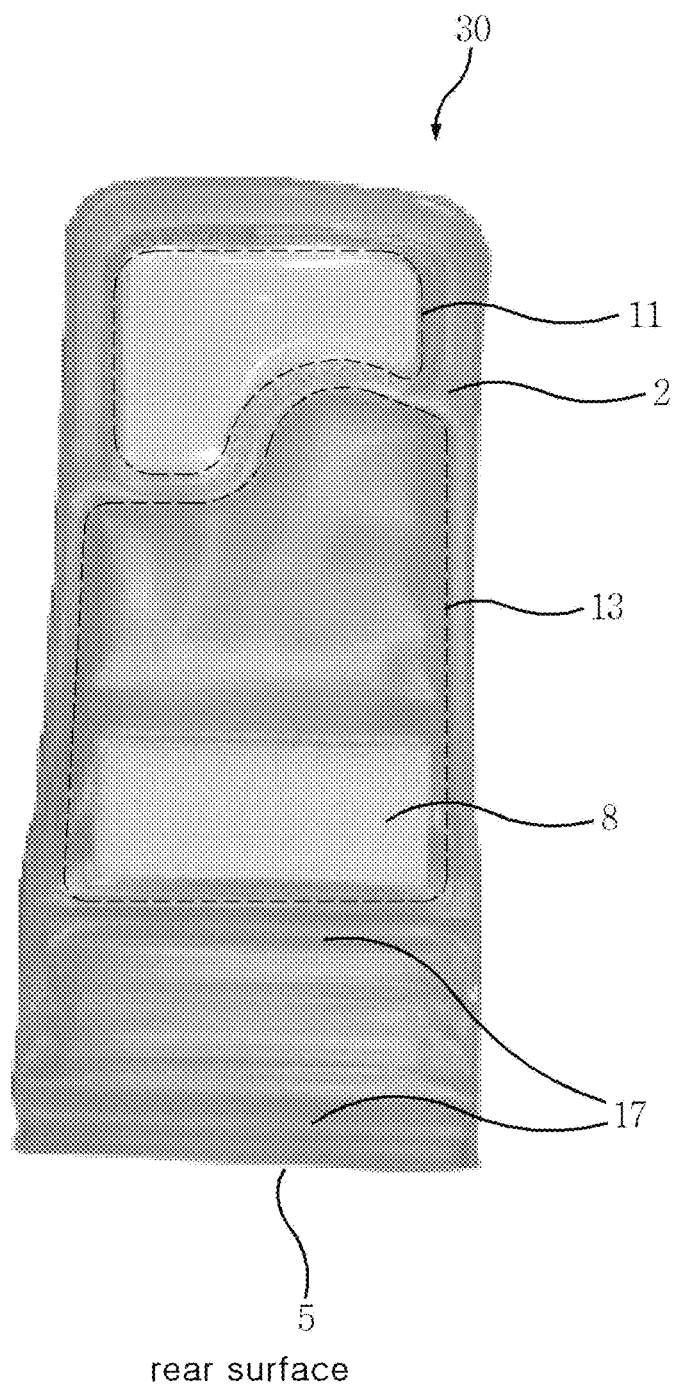
Figure 4C:
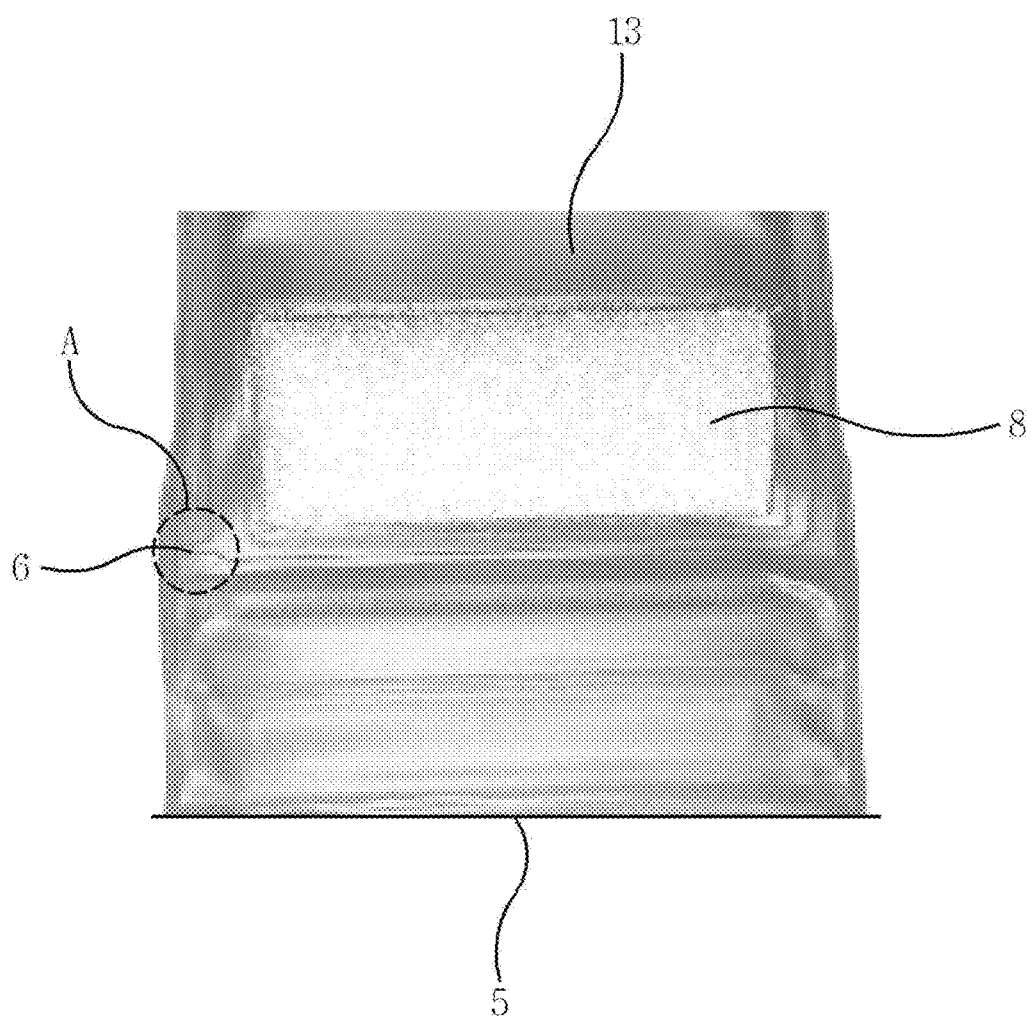

Moreover, FIGS. 4a to 4c are exemplary diagrams illustrating various pictures of a real portable waterproof pack according to the present invention, and more particularly, illustrating an unfolded state of the portable waterproof pack in a lengthwise direction.

Among the drawings, FIG. 4a is a front view of the portable waterproof pack and FIG. 4b is a rear view of the portable waterproof pack.

Referring to the drawings, the portable waterproof pack 30 with an air bladder pack according to the present invention contains an individual portable telecommunication terminal (hereinafter referred to as a portable terminal) such as a smart phone inside, an entrance part 5 of the portable waterproof pack is blocked by folding the entrance part 5, and thus, the water is prevented from getting through the portable waterproof pack. Here, a position, to which the entrance part 5 is folded to be adhered, is a folding line 17 shown in FIG. 4b, and after the entrance part 15 is folded along the position, a folded state is fixed by the entrance-part fixing member 8.

The portable waterproof pack 30 performing the above-described function includes a pack main body 1 which has a certain thickness and inside which an empty space is formed, a transparent window 3 which is formed in a front surface of the pack main body 1 in order for a state of a portable terminal contained inside the pack main body to be seen, and a lenses window 11 which is formed in a rear surface of the pack main body 1 in order for a camera lenses of the portable terminal contained inside the pack main body 1 to be exposed.

The transparent window 3 formed in a front surface of the pack main body 1 is formed to occupy most portion of the front surface of the pack main body 1 and formed generally into a tetragonal shape. Also, the lenses window 11 formed in a rear surface of the pack main body 1 is formed into a relatively smaller size than the transparent window 3 of the front surface, may be formed into a shape which is formed by rotating a '⌐' shape by an angle of 180 degrees in a horizontal direction, and may be formed into any shape including a peanut shape or the like as well as the shape.

Also, the entrance-part fixing member (a reference numeral '8' in FIG. 4b) is formed so as to fold an end portion of the entrance part (a reference numeral '5' in FIGS. 4b and 4c) of the pack main body 1 of the portable waterproof pack 30 to fix the end portion to the pack main body 1, and a string-binding part 7 (a reference numeral '7' in FIGS. 1a and 1b), to which a string is connected, is formed in a certain position of the pack main body 1. A through hole 7a is formed in the string-binding part 7 in order for a string to be easily connected.

In the structure of the portable waterproof pack 30, an air bladder pack 13 is formed in the pack main body 1. That is, as shown in FIGS. 1b and 4b, the air bladder pack 13 of a certain size is formed in the rear surface of the pack main body 1. At this point, the air bladder pack 13 may be formed in a lower portion of the pack main body 1. The reason is that securing a space for forming the air bladder pack 13 is not easy because the transparent windows 3 of the tetragonal shape is formed in the front surface of the portable waterproof pack 30.

Particularly, as shown in FIG. 4b, the air bladder pack 13 of the present invention is formed in the rear surface of the pack main body 1, an upper portion of the air bladder pack 13 is formed in a lower portion of the transparent lenses window 11 formed in the rear surface of the pack main body 1, and a lower portion of the air bladder pack 13 is formed in an upper portion of the string-binding part 7, that is, in an upper portion of the folding line 17.

When the air bladder pack 13 is formed, as shown in FIGS. 2b and 3, an air injection port 6, which passes through the pack main body 1, is formed in a certain direction of a lower portion of the air bladder pack 13, and thus, after an air injection through the air injection port 6 is completed, the air injection port 6 is closed off by sealing the pack main body 1.

In the course of manufacturing the portable waterproof pack 30 according to the present invention, when two or more portable waterproof packs 30 are manufactured at the same time, as shown in FIG. 3, the air injection port 6 passing through one side of a lower portion of the air bladder pack 13 is connected to each of the air bladder packs 13 formed in the portable waterproof packs 30, thereby a manufacturing process becoming easy.

FIGS. 4a to 4c are exemplary diagrams illustrating various pictures of a real portable waterproof pack with an air bladder pack according to the present invention, and FIG. 4c is an enlarged view of a periphery of an air injection port formed in a lower portion of the air bladder pack.

In FIGS. 4a to 4c, the portable waterproof pack 30 with the entrance part 5 (a lower portion in FIGS. 4a to 4c) being unfolded is shown, and except the entrance part 5 of the portable waterproof pack and the upper portion of the entrance part 5, an overall structure of the portable waterproof pack 30 shown in FIGS. 4a to 4c has the same structure as that of the above-described portable waterproof pack, and thus, a detail description is not provide.

When the entrance part 5 of the portable waterproof pack is unfolded in up-and-down direction, a space, through which a portable terminal (not shown) is inserted, is formed. After the portable terminal is inserted into inside the pack main body 1 through the entrance part 5, the entrance part 5 is tightly stuck to be sealed by using a coupling means (not shown) formed in an inner side of the entrance part 5 of the portable waterproof pack, and then, the entrance part 5 is folded and the folded state (a blocked state) of the entrance part 5 is fixed by a fixing member (a reference numeral '8' in FIG. 4b) such as Velcro, thereby the containing of the portable terminal being completed.

In the portable waterproof pack 30 according to the present invention, as shown in FIG. 4a, a separate secondary cover 10 may be formed in the front surface of the portable waterproof pack, and a logo-attached part 9, in which a logo providing an information of a manufacturing company or a sailing company is attached, may be formed in a top surface of the secondary cover 10.

The above-described portable waterproof pack with an air bladder pack according to the present invention may be applied to various products. For example, the portable waterproof pack with an air bladder pack may be applied to various portable waterproof packs including a portable waterproof pack (Korean Patent Registration No. 101042928), a waterproof case for a digital camera (Korean Utility Model Registration No. 200392346) and a bar-typed waterproof case for a hand phone (Korean Design Registration No. 3004686170000), which are applied and registered by this applicant, and another portable waterproof packs similar to them.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

| 1: pack main body | 3: transparent window |
|---|---|
| 5: entrance part | |
| 6: air injection port | 7: string-binding part |
| 8: entrance-part fixing member | 9: logo-attached part |
| 10: secondary cover | 11: lenses window |
| 13: air bladder pack | 30: portable waterproof pack |

The invention claimed is:

1. A portable waterproof pack comprising a pack main body which has a certain thickness and inside which an empty space is formed; a transparent window which is formed in a front surface of the pack main body in order for a portable terminal contained inside the pack main body to be seen; and a lenses window which is formed in a rear surface of the pack main body in order for a camera lenses of the portable terminal contained inside the pack main body to be exposed, wherein, an air bladder pack, which generates a buoyancy in order for the pack main body to float on the water when the pack main body falls into the water, is formed in the rear surface of the pack main body; wherein the air bladder pack is formed in a lower portion of the transparent lenses window.

2. The portable waterproof pack of claim 1, wherein an upper portion of the air waterproof pack is formed to deviate from a lower portion of the lenses window, the upper portion facing the lenses window.

3. The portable waterproof pack of claim 1, wherein an entrance-part fixing member is formed in an upper portion of the air bladder pack so as to fix the entrance part.

* * * * *